(No Model.)

W. E. DANIELS.
BICYCLE.

No. 555,639.   Patented Mar. 3, 1896.

WITNESSES.
Matthew M. Blunt.
A. J. Crawford.

INVENTOR.
William E. Daniels
by A. H. Spencer
ATT'Y.

UNITED STATES PATENT OFFICE.

WILLIAM E. DANIELS, OF SOMERVILLE, MASSACHUSETTS.

BICYCLE.

SPECIFICATION forming part of Letters Patent No. 555,639, dated March 3, 1896.

Application filed June 3, 1895. Serial No. 551,516. (No model.)

*To all whom it may concern:*

Be it known that I, WILLIAM E. DANIELS, of Somerville, in the county of Middlesex and State of Massachusetts, have invented certain new and useful Improvements in Bicycles, of which the following, taken in connection with the accompanying drawings, is a specification.

The object of my invention is to improve bicycles of the ordinary safety type, by giving an elastic action, vertically, to the steering-handle, so as to relieve the rider's hands and arms of the incessant tremor or shiver arising from the rigidity of the various parts in riding over cobblestone or other uneven pavements. But for the pneumatic tire this jar or chatter would be intolerable with wheels of moderate diameter, and even with the relief thus afforded the nervous shock is serious. By my improvement a yielding action is attained without sacrificing the rider's control over the vehicle.

My invention consists in a bicycle or tricycle having its operating or steering handles connected to the fork or head by a yielding arm elastic in a vertical direction, but practically rigid horizontally, and provided with a stop or rest to limit such vertical yielding, in combination with a rigid extension on the head of the vehicle passing through a slot in the yielding arm, which limits its movement.

Another feature of improvement is an adjustable reinforcing-spring serving to give the desired amount of elastic support for the yielding arm. The handle-bar itself may be vertically elastic.

Figure 1:
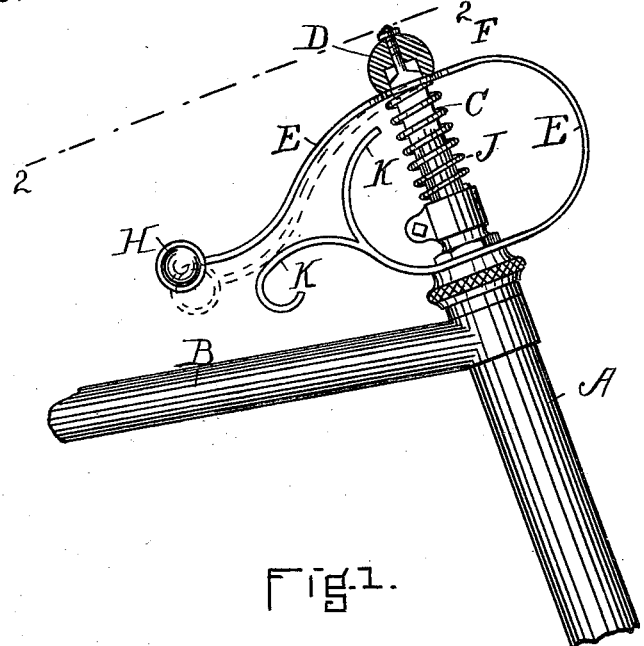
Figure 2:
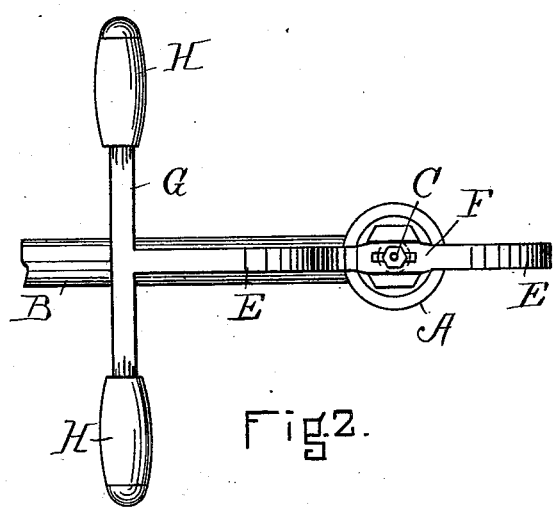

In the drawings, Figure 1 is a side elevation of the head of a bicycle provided with my improvement. Fig. 2 is a top view thereof.

A represents the fork or head of the bicycle to which the frame-bars B are secured as usual.

C is a rigid blade or flattened standard fixed in the upper end of the head A and provided at top with a knob or finishing-nut D.

E is a curved spring-arm, secured to the head A at the base of the blade C, extending thence forward, upward and rearwardly and formed with a slot F, through which the upper portion of the flattened standard C passes. The handle-bar G, which carries the handles H, is secured to the rearward extremity of the spring-arm E. This handle-bar is also preferably flattened horizontally and made thin enough to be quite elastic vertically.

The standard C is a steel bar having a width from front to rear two or three times its thickness, and the walls of the elongated slot F fit the sides of said bar, leaving space at the ends of the slot for the yielding movement of the spring-arm. By this construction the arm may yield in a vertical plane, and yet be capable of controlling the head or fork A and the leading wheel, which must turn with it when the handles are moved horizontally.

A coiled spring J surrounding the standard C gives a support to the spring-arm, and its stiffness may be adjusted by a nut at either end. The tip of the standard is shown reduced in diameter, made cylindrical, and threaded for the recessed knob D to screw upon, or to be held fast by a terminal nut. One or more rests or stops K are formed to limit the downward movement of the free end of the spring-arm, as indicated by the dotted line in Fig. 1.

It is obvious that the spring-arm may be passed through a slot or recess in the head A instead of the extension C of the head passing through a slot in the arm, with similar results. I however prefer the construction illustrated and described.

A rubber spring may be substituted for the spiral spring J, and a noiseless buffer for the stop K.

I claim as my invention—

1. In a bicycle the head A and rigid flattened standard C, in combination with the handles H, the spring-arm E, secured at base firmly to the head, curving rearwardly, and slotted to receive said standard, such arm and handles having a yielding movement in a vertical plane independent of said standard, but engaging therewith at the sides of said slot so as to control the axial movement of said head and to turn laterally with it, substantially as set forth.

2. In a bicycle, the combination with the frame and handles, of a spring connectingarm, elastic vertically but not horizontally, an adjustable spring adapted to regulate the elasticity of said arm, and a stop or rest serving to limit the vertical yielding of the handles, substantially as set forth.

In testimony whereof I have signed my name to this specification, in the presence of two subscribing witnesses, on this 15th day of April, A. D. 1895.

WILLIAM E. DANIELS.

Witnesses:
A. H. SPENCER,
THOMAS J. KENNY.